(12) United States Patent
Heldberg

(10) Patent No.: US 9,394,824 B2
(45) Date of Patent: Jul. 19, 2016

(54) COOLING SYSTEM FOR A COMBUSTION ENGINE

(75) Inventor: Carsten Heldberg, Kirchlinteln (DE)

(73) Assignee: ITW AUTOMOTIVE PRODUCTS GMBH, Iserlohn (DE)

( * ) Notice: Subject to any disclaimer, the term of this patent is extended or adjusted under 35 U.S.C. 154(b) by 65 days.

(21) Appl. No.: 13/131,660

(22) PCT Filed: Nov. 25, 2009

(86) PCT No.: PCT/IB2009/055339
§ 371 (c)(1),
(2), (4) Date: May 27, 2011

(87) PCT Pub. No.: WO2010/061343
PCT Pub. Date: Jun. 3, 2010

(65) Prior Publication Data
US 2011/0247575 A1    Oct. 13, 2011

(30) Foreign Application Priority Data
Nov. 28, 2008 (DE) .................. 10 2008 059 613

(51) Int. Cl.
| | |
|---|---|
| F01P 7/16 | (2006.01) |
| F01P 7/14 | (2006.01) |
| F01P 11/18 | (2006.01) |
| F16K 15/18 | (2006.01) |
| F16K 31/06 | (2006.01) |

(52) U.S. Cl.
CPC ... *F01P 7/14* (2013.01); *F01P 7/16* (2013.01); *F01P 11/18* (2013.01); *F16K 15/181* (2013.01); *F16K 31/0682* (2013.01); *F01P 2007/146* (2013.01)

(58) Field of Classification Search
CPC ............... F01P 7/16; F01P 7/14; F01P 11/18; F01P 2007/146; F16K 15/181
USPC .................. 123/41.08; 251/82, 336, 337; 137/315.33
See application file for complete search history.

(56) References Cited

U.S. PATENT DOCUMENTS

| 4,371,881 A * | 2/1983 | Bork et al. ..................... 347/29 |
| 5,768,646 A * | 6/1998 | Inoue ............................ 396/390 |
| 2012/0049098 A1* | 3/2012 | Willoquet ..................... 251/337 |

FOREIGN PATENT DOCUMENTS

| DE | 10354230 A1 * | 6/2005 |
| JP | 56159514 A | 12/1981 |
| JP | 4109028 A | 4/1992 |
| WO | 2005078255 A2 | 8/2005 |
| WO | WO 2005078255 A2 * | 8/2005 |

OTHER PUBLICATIONS

ISR for PCT/IB09/55339 dated Mar. 11, 2010.

* cited by examiner

*Primary Examiner* — Lindsay Low
*Assistant Examiner* — Jacob Amick
(74) *Attorney, Agent, or Firm* — Hauptman Ham, LLP

(57) ABSTRACT

An internal combustion engine's cooling system of which a cooling water regulator is situated in a cooling circuit, said regulator being driven by an engine control in a manner to temporarily wholly interrupt the flow of cooling water, said regulator being shunted by a subsidiary branch containing a blocking element which is associated with a lock driven by the engine control, and the blocking element being designed to be moved by the cooling water pressure in the subsidiary branch into an open position.

15 Claims, 1 Drawing Sheet

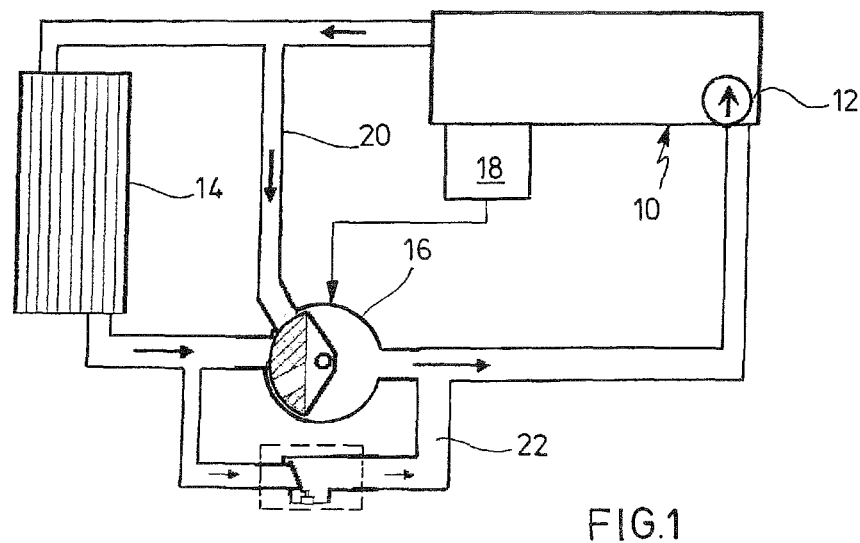
FIG.1
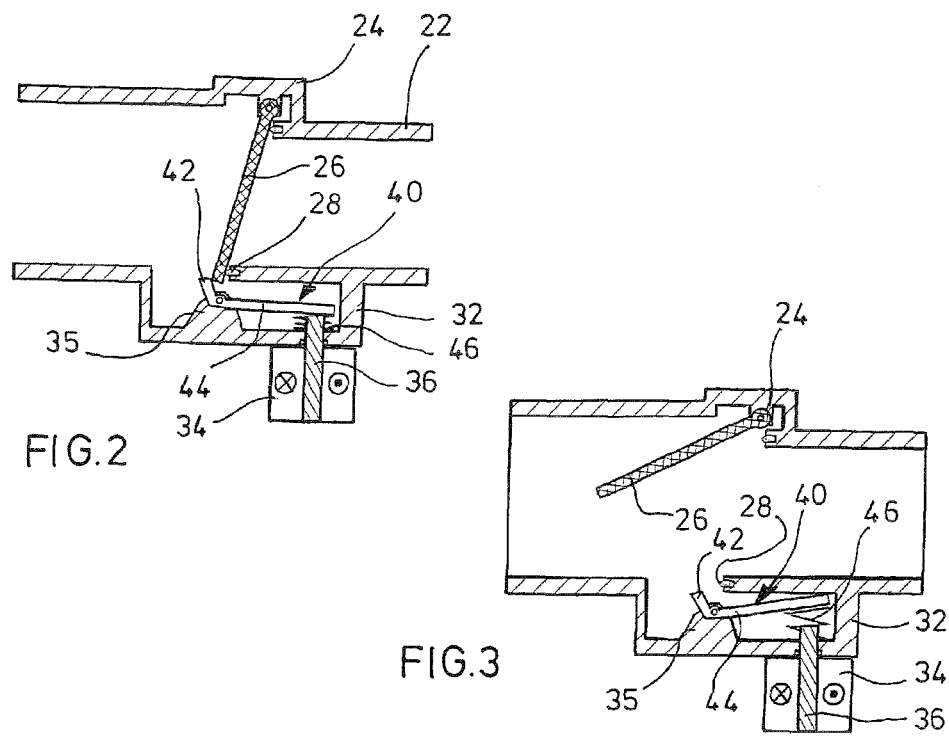
FIG.2
FIG.3

COOLING SYSTEM FOR A COMBUSTION ENGINE

RELATED APPLICATIONS

The present application is national phase of PCT/IB2009/055339 filed Nov. 25, 2009, and claims priority from, German Application Number 10 2008 059 613.2 filed Nov. 28, 2008.

The present invention relates to an internal combustion engine's cooling system defined in claim 1.

Typically an internal combustion engine's cooling system comprises a main cooling circuit in which cooling water flowing through said engine crosses a radiator. Moreover it comprises a bypass conduit open during the engine's start phase whereby the cooling water circulates via the bypass through the engine, Conventionally a thermostatic valve system controls the cooling water flow and is fitted with at least one thermostatic valve driven in general by a so-called thermally expansible element and fitted with a bypass valve. The thermostatic and bypass valves are connected to each other in a manner that, at a given lower temperature, the thermostatic valve is closed and the bypass valve is open. As the temperature rises, the thermostatic valve will open and the bypass valve will gradually close.

It is known regarding more recent cooling systems to completely interrupt the water circulation in the internal combustion engine during the cold start phase in order to more quickly heat the engine to its operational temperature and in this manner to reduce both fuel consumption and exhaust-gases emission. During such a shutoff, control no longer can be implemented by the thermally expansible element because the cooling water does not circulate through the motor during its start phase and consequently the instantaneous temperature information, namely the temperature of the piston bearing surfaces, cannot be communicated to the thermally expansible element to assure timely termination of the cold start shutoff.

It is known to use control valves driven by an electric motor to regulate the volume of cooling water. This design also implements the desired cold start. The cooling water regulator is driven by the engine control which in turn receives its temperature data from appropriate sensors. Electromotively driven adjustment valves, which illustratively assume a secured position by means of spring bias, are very costly, because the drive must permanently operate against a fail-safe spring and because the position regulation of the drive is both costly and required. In either case a cooling water regulator driven by the engine control fails to stay closed after the cold start phase.

On the other hand relatively simple designs of electromotive drives for regulating valves have become known which illustratively make use of worm drives. In this case a separate fail-safe mechanism is required to protect the internal combustion engine against damage in the event of malfunction.

The objective of the present invention is to create an internal engine cooling system, using simple means and terminating the cold start phase in the event the regulating valve or the thermostatic valve should fail to open.

This problem is solved by the features of claim 1.

The cooling water regulator of the cooling system of the present invention is shunted by a subsidiary branch containing a blocking element. An engine-control driven lock is associated with the blocking element and selectively releases it. The blocking element is designed in a way to be moved into the open position by the cooling water's pressure in the subsidiary branch.

In one embodiment of the present invention, the blocking element is a flap which in its closed position rests by gravity against an annular stop. The lock comprises a latching element which in its locked position enters the bypass on the side opposite the stop. In this manner the flap is precluded from pivoting into the open position.

In a further advantageous embodiment mode of the present invention, the lock includes an electromagnet of which the core is connected to a pin acting as the latching element or to a locking lever. The pin or an arm of said lever may be selectively displaced into the flap's path of rotation or out of it.

Accordingly the present invention consists of a simple, separate fail-safe mechanism in the form of a flap closing a fail-safe water path respectively closing it in the event of Malfunction respectively being appropriately driven by the engine control. Regulation may be implemented using a comparatively small electromagnet which, by means of a spring, biases a latching element into the locked position. When the engine control detects a critical situation, the electromagnet shall be driven in a way to retract the latching element, whereupon the fail-safe flap can be opened by the water pressure. In this manner adequate water circulation is assured through the engine. After the internal combustion engine has been shut off, that is, when the water is no longer pressurized, the flap may pivot back by gravity into the locked position. Alternatively a small/weak restoring spring may also be used to move the flap into the closed position. When in the start phase of the internal combustion engine, but before the start actually has begun, the engine control shall actuate the locking magnet and thereby the fail-safe flap shall be secured against pivoting toward/into the open position.

In the event of malfunction, the flap is preferably unlocked by the spring force. Possible malfunctions include rupture of the cable feeding the magnet. When no electric power is applied to the magnet, the flap shall be unlocked. Illustratively locking by means of the electromagnet takes place in the start phase due to ignition, however just before the engine starts, such a relatively short phase suffices to actuate the magnet.

The invention is elucidated below in relation to the appended drawings:

FIG. 1 shows a cooling system of the invention,

FIG. 2 is an enlarged detail of the bypass conduit of the cooling system of FIG. 1 when the flap is closed, and FIG. 3 shows the flap of FIG. 2 in its open position.

An internal combustion engine 10 is shown schematically in FIG. 1 and drives, among other components, also a water pump 12. This internal combustion engine 10 is associated with a cooling circuit fitted with a radiator 14. The radiator 14 is configured in a conduit running from the engine 10 through a cooling water regulator 16 to the water pump 12 at said engine. The regulating element in the cooling water regulator 16 is actuated by an omitted drive, illustratively a worm drive or the like, the drive actuation being supplied by an engine control 18. The engine control 18 detects the particular engine states, inclusive, by means of appropriate sensors, the instantaneous temperatures. The main cooling circuit being discussed is shunted by a bypass 20 which also runs to the cooling water regulator 16. In order that the internal combustion engine 10 reach as soon as possible its operational temperature, the cooling water initially circulates by means of the cooling water regulator 16 only through the bypass 20. The bypass 20 shall be blocked only after the water temperature has reached a certain magnitude and only then shall the main circuit be fully open. Such regulation of the flow of cooling water is already is used. In fact it is already in use employing thermostatic regulation.

Compared with a thermostat, a cooling water regulator offers its advantageous ability to completely interrupt the flow of cooling water which is indicated by individual arrows in FIG. 1. Such interruption is carried out in the so-called cold start phase in order that the engine due to the non-circulating cooling water be heated comparatively quickly. In such a procedure fuel saving and emission reduction are attained. As soon as a given cooling water temperature has been reached, the engine control 18 of the cooling water regulator 16 shall be actuated commensurately. However, if for some reason the elimination of the cold start phase by means of the cooling water regulator should not take place, there would be danger of overheating the internal combustion engine 10. To avert such malfunction, a subsidiary branch 22 is provided that shunts the cooling water regulator 16, A portion 22 of the subsidiary branch 22 is shown on an enlarged scale in FIGS. 2 and 3.

A flap 26 supported by and pivoting about an upper pivot 24 is shown in its closed position of FIG. 2, resting against an annular seal 28. Such contact illustratively is by gravity, the flap 26 even in its closed position being oblique to the vertical. However a weak/small restoring spring also may be used to bias the flap towards its closed position. Preferably such spring shall be configured on the pivot 24.

An electromagnet 34 is mounted on a recess structure 32 of the subsidiary branch 22, the core of said magnet passing in sealed manner through a wall of said structure into said recess 32. A two-arm lever rests in pivotable manner on a rise 35 in said recess. One arm 42 acts as the locking segment and another arm 44 is biased by a spring 46 toward a disengaged position. The core 36 operates in concert with the arm 44 which is made of a magnetizable material. FIG. 2 shows the locked position. In this locked position, the arm 44 rests against the core 36 and the spring 46 is compressed, the arm 42 being situated opposite the stop's seal 28, and the flap is precluded from pivoting into the open position shown in FIG. 3. The flow of cooling water in FIG. 1 is indicated at 42. On the other hand there can be no flow when the flap 26 is closed. Accordingly this is the state of ordinary operation of the cooling system of FIG. 1. However if, following a cold start phase and heating the cooling water, the cooling water regulator 16 fails to open, as a result of which the cooling water remains still, the engine control 18 shall deactivate the magnet 34 for instance as a function of measured engine temperature. The spring 46 moves the locking lever 40 into the disengaged position, allowing thereby the flap 26 to pivot into its open position and allowing the cooling water to flow. In this manner a fail-safe mechanism is in place which shall also be effective if the magnet 34 were to be permanently inactive for instance due to cable rupture.

As soon as electric power is applied to the magnet 34, the locking lever 40 is pivoted into the locking position of FIG. 2. This takes place for instance when starting the internal combustion engine.

The invention claimed is:

1. An internal combustion engine cooling system having a cooling water regulator configured in a cooling circuit, said cooling water regulator operable by an engine control in such manner to temporarily wholly interrupt the flow of the cooling water, comprising:
 a subsidiary branch,
 a flap element having a first end and a second end and wholly disposed within said subsidiary branch, said second end pivotally connected to said subsidiary branch,
 a locking lever having a first arm and a second arm, said locking lever pivotally attached at a point intermediate said first arm and said second arm, and
 an electromagnetic locking apparatus having a core and a spring member,
 wherein said first arm is magnetically attached to said core against the biasing force of said spring member and said second arm engages said first end of said flap element when said locking lever is in a locked configuration, and
 wherein said core disengages from said first arm thereby allowing the locking lever to pivot due to the biasing force of said spring member thereby allowing the second arm to disengage said first end of said flap element when said locking lever is in an unlocked configuration,
 whereby said flap element pivots as a result of the water pressure within said subsidiary branch, and
 wherein the spring member biases the locking lever in a direction that unlocks the flap element such that the flap element is enabled to move from a closed position to an open position,
 wherein at least a portion of the spring member encircles at least a portion of the core, and wherein the spring member applies a compressive force onto the first arm.

2. Cooling system as claimed in claim 1, wherein the flap, in its closed position, rests by gravity against an annular stop, and further comprising a latching element which in its locking position enters the subsidiary branch on the side opposite said annular stop and which prevents pivoting the flap into its open position.

3. Cooling system as claimed in claim 2, wherein the core is connected to a pin acting as the latching element.

4. Cooling system as claimed in claim 2, wherein the annular stop is fitted with a seal.

5. An internal combustion engine cooling system having a cooling water regulator configured in a cooling circuit, said cooling water regulator operable by an engine control in such manner to temporarily wholly interrupt the flow of the cooling water, comprising:
 a subsidiary branch having a recess,
 a flap element having a first end and a second end and wholly disposed within said subsidiary branch, said second end pivotally connected to said subsidiary branch,
 a locking lever having a first arm and a second arm, said locking lever pivotally attached in said recess at a point intermediate said first arm and said second arm, and
 an electromagnetic locking apparatus having an electromagnet with a core and a spring member,
 wherein said electromagnet is mounted on said recess with said core passing in sealed manner through a wall of said recess into said recess,
 wherein said first arm is magnetically attached to said core against the biasing force of said spring member and said second arm engages said first end of said flap element when said locking lever is in a locked configuration, and
 wherein said core disengages from said first arm thereby allowing the locking lever to pivot due to the biasing force of said spring member thereby allowing the second arm to disengage said first end of said flap element when said locking lever is in an unlocked configuration,
 whereby said flap element pivots as a result of the water pressure within said subsidiary branch,
 wherein at least a portion of the spring member encircles at least a portion of the core, and wherein the spring member applies a compressive force onto the first arm.

6. Cooling system as claimed in claim 5, wherein said electromagnet of said electromagnetic locking apparatus is activated by said engine control, and said locking lever is in said unlocked configuration due to the biasing force of said spring member when said electromagnet is inactive due to malfunction of said engine control.

7. Cooling system as claimed in claim 5, wherein said recess has a rise therein and said locking lever is pivotally attached to said rise.

8. An internal combustion engine cooling system as claimed in claim 1, wherein the first arm of the locking lever is substantially longer than the second arm of the locking lever.

9. An internal combustion engine cooling system as claimed in claim 1, wherein the system is configured such that the system has a failure mode of the electromagnetic locking apparatus that unlocks the flap element.

10. An internal combustion engine cooling system as claimed in claim 1, wherein the system has a failure mode of the electromagnetic locking apparatus that unlocks the flap element.

11. An internal combustion engine cooling system as claimed in claim 5, wherein the first arm of the locking lever is substantially longer than the second arm of the locking lever.

12. An internal combustion engine cooling system as claimed in claim 5, wherein the system is configured such that the system has a failure mode of the electromagnetic locking apparatus that unlocks the flap element.

13. An internal combustion engine cooling system as claimed in claim 5, wherein the system has a failure mode of the electromagnetic locking apparatus that unlocks the flap element.

14. An internal combustion engine cooling system as claimed in claim 5, wherein the spring member biases the locking lever in a direction that unlocks the flap element such that the flap element is enabled to move from a closed position to an open position.

15. An internal combustion engine cooling system having a cooling water regulator configured in a cooling circuit, said cooling water regulator operable by an engine control in such manner to temporarily wholly interrupt the flow of the cooling water, comprising:
    a subsidiary branch,
    a flap element having a first end and a second end and wholly disposed within said subsidiary branch, said second end pivotally connected to said subsidiary branch,
    a locking lever having a first arm and a second arm, said locking lever pivotally attached at a point intermediate said first arm and said second arm, and
    an electromagnetic locking apparatus having a core and a spring member,
    wherein said first arm is magnetically attached to said core against the biasing force of said spring member and said second arm engages said first end of said flap element when said locking lever is in a locked configuration, and
    wherein said core disengages from said first arm thereby allowing the locking lever to pivot due to the biasing force of said spring member thereby allowing the second arm to disengage said first end of said flap element when said locking lever is in an unlocked configuration,
    whereby said flap element pivots as a result of the water pressure within said subsidiary branch,
    wherein at least a portion of the spring member encircles at least a portion of the core, and wherein the spring member applies a compressive force onto the first arm.

\* \* \* \* \*